R. Gleason, Jr,
Caster and Egg-Stand,
Nº 23,218. Patented Mar. 8, 1859.

Witnesses.
George Bridgham
Andrew J. Vase

Inventor.
R. Gleason Jr

UNITED STATES PATENT OFFICE.

R. GLEASON, JR., OF DORCHESTER, MASSACHUSETTS, ASSIGNOR TO R. GLEASON & SONS, OF SAME PLACE.

TABLE-CASTER.

Specification forming part of Letters Patent No. 23,218, dated March 8, 1859; Reissued December 27, 1859, No. 871.

*To all whom it may concern:*

Be it known that I, R. GLEASON, Jr., of Dorchester, in the county of Norfolk and State of Massachusetts, have invented a new and useful Article of Manufacture for the Table, the same being a Combination of Caster, Egg-Stand, and Bell; and I do hereby declare that the following is a full, clear, and exact description of the same, reference being had to the annexed drawings, making a part of this specification, in which—

Figure 1:
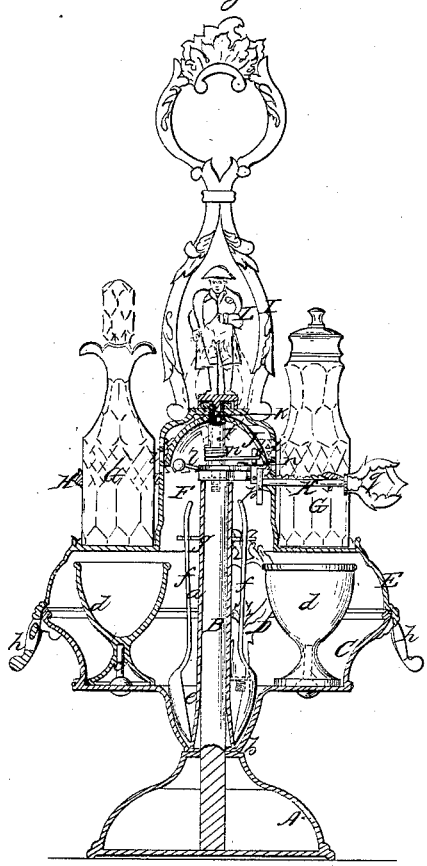
Figure 2:
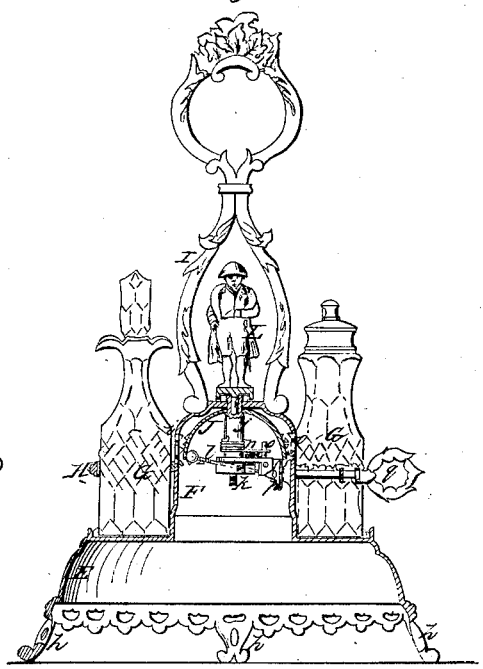

Figure 1, is a vertical central section of my invention complete. Fig. 2, a detached vertical central section of the caster and bell.

Similar letters of reference indicate corresponding parts in the two figures.

This invention consists in combining an egg-stand, caster and bell, as hereinafter fully shown and described, whereby either article may be used separately when desired, and the egg stand when not required for use, made to serve as a revolving support for the caster and bell, the several articles forming a very ornamental affair, and a much more economical one than if the several pieces were made separately.

To enable those skilled in the art to fully understand and construct my invention I will proceed to describe it.

A, Fig. 1, represents a base in which a vertical rod B, is placed centrally, and C, is a circular basin or dish which is provided with a central tube $a$, through which the rod B, passes, the tube $a$, extending nearly to the top of the rod B, as shown clearly in Fig. 1. The basin or dish C, is allowed to rotate freely on the rod B, the bottom of the basin or dish resting or bearing on the top $b$, of the base A, a sufficient bearing surface being allowed for such purpose.

Within the disk or basin C, a series of vertical rods $c$, are secured on which egg-cups $d$, are placed, said rods keeping the cups in proper position, and at the center of the dish or basin, encompassing the base of the tube $a$, an annular chamber $e$, is formed to receive the bowls of spoons $f$, the upper ends of which are secured in a circular rack $g$, attached to the upper part of the tube $a$.

The above parts which are all shown in Fig. 1, constitute a revolving egg-stand, and if used separately a handle D, may be screwed into the upper end of the rod B, as shown in red Fig. 1.

E, is a circular inverted dish having a cylindrical chamber F, at its center, said chamber being considerably smaller in diameter than the dish E, so as to afford space all around it to hold cruets G, which are placed in annular holders H, secured to the upper part of the chamber F.

The bottom of the dish E is provided with feet $h$, and to the upper part of the chamber F, a handle I, is attached, as shown clearly in Fig. 2.

Within the upper part of the chamber F, a bell J, is secured, the part of the chamber which immediately encompasses said bell, being perforated as shown at $i$. The bell is secured in proper position by a tube $j$, through which a screw rod $k$, passes. On the tube $j$, a hammer rod $l$, is secured by a pivot $m$, and $n$, is a spring which is connected with the hammer rod as shown at $o$.

K, is a rod which passes horizontally through the chamber F, and has a wiper $p$, on its inner end within the chamber F, the outer end of said rod having a handle $q$, placed on it.

The bell J, it will be seen is sounded by turning the rod K, the wiper $p$, of which in connection with the spring $n$, actuates the hammer rod $l$.

The parts which are shown in Fig. 2, and latterly described constitute the caster and bell and may be used detached from the egg-stand if desired. When used in connection with the egg-stand, the handle D, is detached from the upper end of the rod B, and the caster placed over the egg-stand, the screw rod $k$, being screwed into the upper end of the rod B, by means of any suitable handle L.

The inverted dish or basin E, of the caster serves as a cover for the egg-stand concealing it and its appurtenances from view and the egg-stand serves as a revolving base for the caster, the whole forming a very useful and unique article for the table, and one that may be constructed much cheaper than if the several parts were made separately, for one device is made in a measure to serve the other, for instance, a caster whether stationary or rotary should, if proportion is at all considered, have a base of some considerable height and the same may be said of an egg-stand.

By my invention one base is used for both the egg-stand, and caster, and as the former comparatively is but rarely used it serves as a superior revolving base for the caster which is almost invariably used. Many therefore who would not go to the expense of providing themselves with an egg-stand, would purchase the several parts combined, at a slight advance on a caster alone.

I do not claim separately any of the parts herein shown and described, when seperately considered; but, I desire to secure by Letters Patent and claim—

As a new and useful article of manufacture a caster, egg-stand and table bell, arranged and combined as herein shown and described.

R. GLEASON, JR.

Witnesses:
ANDREW J. VOSE,
ROBERT VOSE.

[FIRST PRINTED 1911.]